US010181217B2

(12) United States Patent
Yonesaka et al.

(10) Patent No.: US 10,181,217 B2
(45) Date of Patent: Jan. 15, 2019

(54) DATA PROCESSING APPARATUS, THREE DIMENSIONAL OBJECT MOLDING SYSTEM, AND NON-TRANSITORY COMPUTER READABLE MEDIUM

(71) Applicant: FUJI XEROX CO., LTD., Tokyo (JP)

(72) Inventors: Ryosuke Yonesaka, Kanagawa (JP); Koichi Matsubara, Kanagawa (JP); Kenji Hara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/730,373

(22) Filed: Oct. 11, 2017

(65) Prior Publication Data

US 2018/0108176 A1 Apr. 19, 2018

(30) Foreign Application Priority Data

Oct. 19, 2016 (JP) ................................ 2016-205274

(51) Int. Cl.
*G06T 17/30* (2006.01)
*G06T 15/20* (2011.01)
*G06T 17/00* (2006.01)
*G06T 19/20* (2011.01)

(52) U.S. Cl.
CPC ............ *G06T 17/30* (2013.01); *G06T 15/205* (2013.01); *G06T 17/00* (2013.01); *G06T 19/20* (2013.01); *G06T 2200/04* (2013.01); *G06T 2210/04* (2013.01); *G06T 2219/2012* (2013.01)

(58) Field of Classification Search
None
See application file for complete search history.

(56) References Cited

U.S. PATENT DOCUMENTS

2001/0009463 A1* 7/2001 Kuno .................... G06K 15/02 358/1.9

FOREIGN PATENT DOCUMENTS

JP 2006-503735 A 2/2006
WO 2004/037520 A3 6/2004

OTHER PUBLICATIONS

Brunton A, Arikan CA, Urban P. Pushing the limits of 3d color printing: Error diffusion with translucent materials. ACM Transactions on Graphics (TOG). Dec. 29, 2015;35(1):4.*

* cited by examiner

*Primary Examiner* — Michelle Chin
(74) *Attorney, Agent, or Firm* — Oliff PLC

(57) ABSTRACT

A data processing apparatus includes a receiving unit that receives first data that defines a shape of and a color of a surface of a three-dimensional object on each specific surface region of the three-dimensional object, and a generating unit that generates color voxel data from the first data. The generating unit assigns plural color components to plural surface voxels in accordance with color information on the color of the surface in the first data, starting with surface voxels, in a priority order of the color components from one having a lower lightness value to another having a higher lightness value, and does not assign an achromatic color component to a surface voxel if a density of the color of the surface in the first data is less than 100 percent.

9 Claims, 17 Drawing Sheets

16
18

| | | COLOR | | | | | | | | | |
|---|---|---|---|---|---|---|---|---|---|---|---|
| | | W | Y | M | C | K | YM | MC | YC | ... | YM CK |
| DEPTH | 0 | W | Y | M | C | K | M | C | C | ... | K |
| | 1 | W | W | W | W | W | Y | M | Y | | C |
| | 2 | W | W | W | W | W | W | W | W | | M |
| | 3 | W | W | W | W | W | W | W | W | | Y |

FIG. 11A
100
102
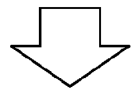
FIG. 11B
101
103
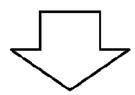
FIG. 11C
105
107

FIG. 14

| | INPUT COLOR | REDDISH DEEP BLACK | VERY DEEP GREEN | VERY DEEP PROCESS BLACK (YMCK MIXTURE) |
|---|---|---|---|---|
| | NUMBER OF LAYERS | LAYER Y2<br>LAYER M2<br>LAYER K2 | LAYER Y3<br>LAYER C3 | LAYER Y2<br>LAYER M2<br>LAYER C2<br>LAYER K2 |
| DEPTH | 0 | K | C | K |
| | 1 | M | Y | K |
| | 2 | Y | C | C |
| | 3 | K | Y | M |
| | 4 | M | C | Y |
| | 5 | Y | Y | C |
| | 6 | W | W | M |
| | 7 | W | W | Y |

FIG. 18A

| 0 | 0 | 0 | 0 | 0 | 0 | 0 | 0 |
|---|---|---|---|---|---|---|---|
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| | | | | | | | |
| | | | | | | | |

FIG. 18B

| 0 | 0 | 0 | 0 | 0 | 0 | 0 | 0 |
|---|---|---|---|---|---|---|---|
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| | | | | | | | |
| | | | | | | | |

FIG. 18C

| 0 | 0 | 0 | 0 | 0 | 0 | 0 | 0 |
|---|---|---|---|---|---|---|---|
| 1 | 1 | 1 | 1 | 1 | 1 | 1 | 1 |
| 2 | 2 | 2 | 2 | 2 | 2 | 2 | 2 |
| 3 | 3 | 3 | 3 | 3 | 3 | 3 | 3 |
| | | | | | | | |
| | | | | | | | |

DATA PROCESSING APPARATUS, THREE DIMENSIONAL OBJECT MOLDING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-205274 filed Oct. 19, 2016.

BACKGROUND

(i) Technical Field

The present invention relates to a data processing apparatus, a three-dimensional object molding system, and a non-transitory computer readable medium.

(ii) Related Art

Three-dimensional (3D) object molding apparatuses, or 3D printers have been disclosed. A 3D printer is used to mold a 3D object. In a disclosed technique, for example, the 3D printer receives, as input data, data defining a shape and color of the 3D object (such as polygon data). The 3D object molding apparatus converts the received data into voxel data and molds a 3D object in accordance with the voxel data. If the molding apparatus outputs plural color materials, the molding apparatus may mold a color 3D object, based on color voxel data in which color information is assigned to each voxel.

A technique is available to generate the color voxel data from the input data. According to the technique, the color of a surface of a molded object, when viewed from the outside, is set to be closer to a color in the input data. To this end, different color components of color information of the input data in a specific surface region are respectively assigned to a surface voxel in the specific surface region and an inner voxel located inside the surface voxel. When plural-colored components are assigned to plural voxels including the surface voxel and the inner voxel, no particular assignment priority order is set. For example, if a light color component is assigned to the surface voxel, and a dark color component is assigned to the inner voxel, the object looks very much different depending on the viewing location and viewing angle.

SUMMARY

According to an aspect of the invention, there is provided a data processing apparatus. The data processing apparatus includes a receiving unit that receives first data that defines a shape of and a color of a surface of a three-dimensional object on each specific surface region of the three-dimensional object, and a generating unit that generates color voxel data from the first data. The generating unit assigns plural color components to plural surface voxels in accordance with color information on the color of the surface in the first data, starting with surface voxels, in a priority order of the color components from one having a lower lightness value to another having a higher lightness value, and does not assign an achromatic color component to a surface voxel if a density of the color of the surface in the first data is less than 100 percent.

BRIEF DESCRIPTION OF THE DRAWINGS

Exemplary embodiment of the present invention will be described in detail based on the following figures, wherein:

FIG. 11A through FIG. 11C illustrates the color swapping process in detail;

FIG. 14 illustrates a color assignment of a first modification;

FIG. 18A through FIG. 18C illustrate layouts of layers of the exemplary embodiment and the second modification.

DETAILED DESCRIPTION

Exemplary embodiment of the invention is described with reference to the drawings. The definition of terms used in this specification is described below.

The term "voxel" refers to a minimum cubic unit that is used to represent a 3D object. A voxel corresponds to a pixel used in the field of a two-dimensional image. Voxels are combined to visually represent a cubic object. When a 3D object is molded using a 3D object molding apparatus, data that describes as a set of voxels an object to be molded is used. In the same way as with two-dimensional pixels, coloring is performed by voxel unit if color information is assigned to each voxel.

The term "voxel data" refers to data that describes a object to be molded as a set of voxels.

The term "color voxel data" refers to the voxel data with color information assigned to each voxel.

The term "value indicating lightness" indicates black if it is higher, and indicates white if it is lower. Specifically, the term "value indicating lightness" is L* value.

An object having nested inside layers may now be considered. One color, or one color and half-tone, or one color and clear half-tone may be printed on each layer. As the number of colors of the object increases, and the number of mixed-color portions increases, the number of white or clear layers that are not desired increases.

Figure 19A:
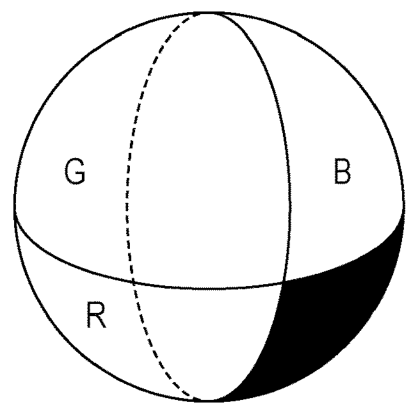
FIG. 19A and FIG. 19B illustrate the color assignment of related art.
Figure 19B:
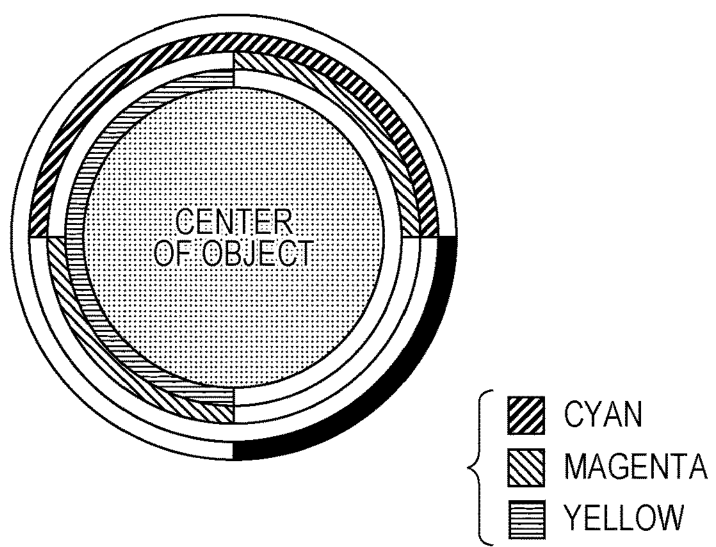

FIG. 19A illustrates an example of such an object. The object is spherical, and parts of the surface thereof are tinted red (R), green (G), blue (B), and black (K). FIG. 19B is a vertical sectional view of the object. There are inner nested layers inwardly from the surface of the object. Each layer is printed with one color, or one color and half-tone, or one color and transparent (clear) half-tone. The layers of the object are referred to as layer 1, layer 2, layer 3, and layer 4 in the order from the outermost layer to the innermost layer. Layer 1 is tinted black (K) and white (or transparent), layer 2 is tinted cyan (C) and white (or transparent), layer 3 is tinted magenta (M) and white (or transparent), and layer 4 is tinted yellow (Y) and white (or transparent).

Since a white or transparent layer is present between CMYK layers or on the surface side, the use of white lowers chroma of the RGB portions. The use of transparent (clear) component causes a gloss difference between a black portion and one of the RGB portions. The exemplary embodiment addresses these problems.

Figure 1:
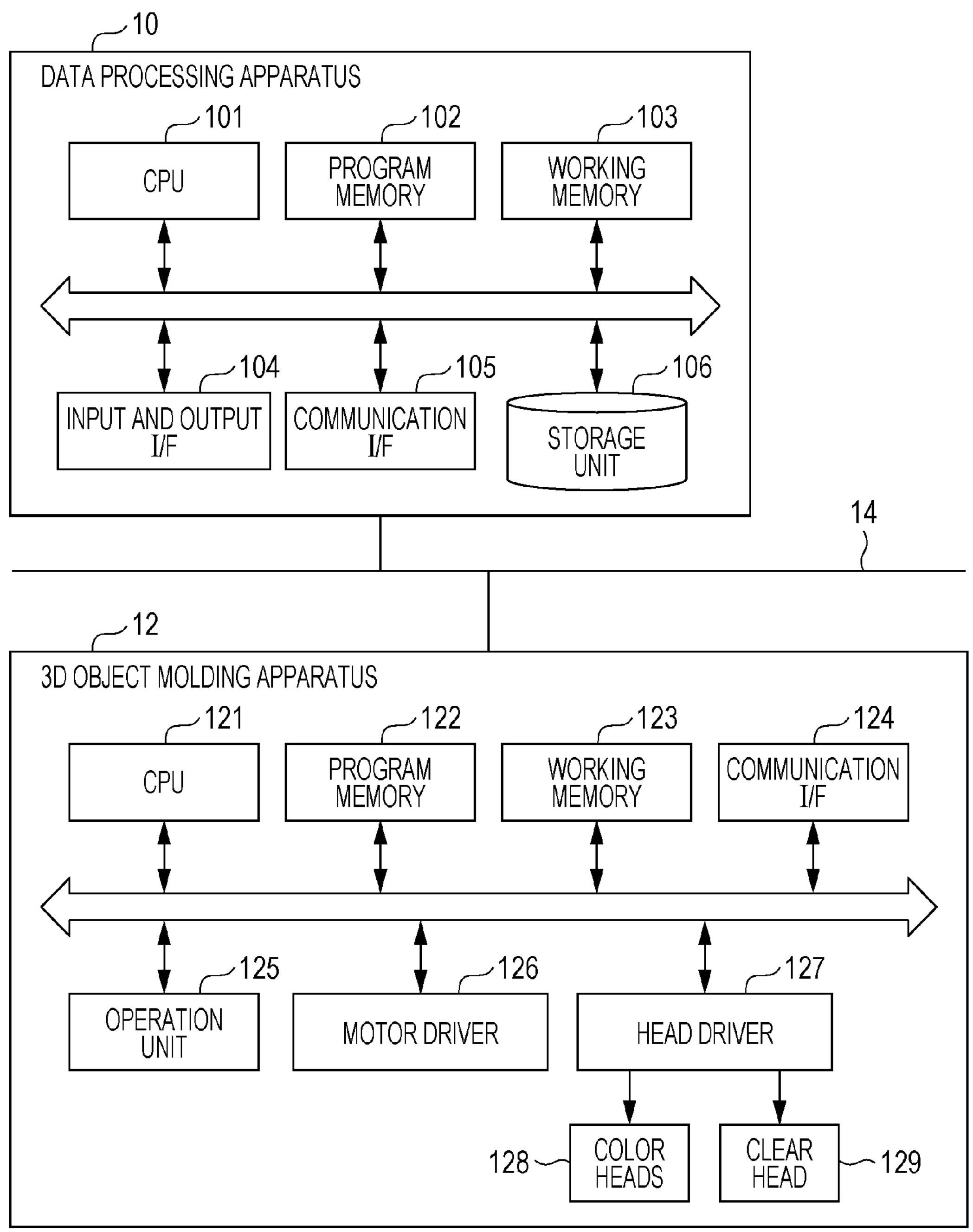
FIG. 1 illustrates a configuration of a system.

FIG. 1 illustrates a configuration of a 3D object molding system of an exemplary embodiment. The 3D object molding system includes a data processing apparatus 10, and a 3D object molding apparatus 12. The data processing apparatus 10 is connected to the 3D object molding apparatus 12 via a communication network 14.

The data processing apparatus 10 receives 3D object data (3D data), performs a specific process on the 3D data, and then outputs process results to the 3D object molding apparatus 12 via the communication network 14. The data processing apparatus 10 includes receiving modules and generating modules. More specifically, the data processing apparatus 10 includes a central processing unit (CPU) 101, a program memory 102, such as a read-only memory (ROM), a solid state drive (SSD), and/or a hard disk drive (HDD), a working memory 103, such as a random-access memory (RAM), a keyboard, a mouse, an optical disk, such as CD-ROM, and a semiconductor memory, such as a universal serial bus (USB) memory or a secure digital (SD) card. The data processing apparatus 10 further includes an input and output interface (I/F) 104 that inputs signals to or receives signals from a display or the like, a communication interface 105 that communicates with external apparatuses including the 3D object molding apparatus 12, and a storage unit 106, such as an HDD. The receiving modules include the input and output interface 104 and the communication interface 105, and the generating modules include the CPU 101. The data processing apparatus 10 may be a computer or a tablet terminal.

The CPU 101 performs a process on the 3D object data by reading a processing program from the program memory 102 and executing the processing program. The CPU 101 outputs the process results to the 3D object molding apparatus 12 via the communication interface 105 and the communication network 14. The CPU 101 performs a conversion process to convert the object data (3D data) into polygon voxels, a color determination process for each voxel, a half-toning process, and a color swapping process.

The 3D object molding apparatus 12 functions as a 3D printer. The 3D object molding apparatus 12 includes a CPU 121, a program memory 122, such as a ROM, a working memory 123, a communication interface (I/F) 124, an operation unit 125, a motor driver 126, a head driver 127, color heads 128, and a clear head 129.

The CPU 121 operates in accordance with a processing program stored on the program memory 122. In response to an operating command from the operation unit 125, the CPU 121 outputs control signals to the motor driver 126 and the head driver 127 using 3D object data input from the 3D object molding apparatus 12 via the communication interface 124. The CPU 121 thus drives a variety of motors and heads.

The motor driver 126 drives the variety of motors including a stage moving motor for a stage that supports an object, and head moving motors.

The head driver 127 controls ejection of inks (molding liquids) for the color heads 128 and the clear head 129. The color heads 128 includes a cyan (C) head, a magenta (M) head, a yellow (Y) head, and a black (K) head. The clear head 129 ejects a colorless transparent ink (molding liquid). The head driver 127 controls the ink ejection by driving a piezoelectric device disposed at an ejection channel of each head. The driving method is not limited to this method. The clear head 129 may eject a white ink rather than ejecting a transparent ink. White or transparent ink is defined as an achromatic ink as opposed to cyan, magenta, yellow, and black inks.

Using slice data of a 3D object output from the data processing apparatus 10, the 3D object molding apparatus 12 outputs inks from the color heads 128 and the clear head 129, and successively stacks slices in the direction of height to form a desired 3D molded object. More specifically, the 3D object molding apparatus 12 ejects inks (molding liquids) to form a 3D molded object while successively moving the color heads 128 and the clear head 129 in three axes, namely, XYZ axes. Alternatively, the color heads 128 and the clear head 129 may be fixed and a stage arranged therebelow may be successively moved in the three XYZ directions.

The color heads 128 may include the cyan (C) head, the magenta (M) head, and the yellow (Y) head, or may include another head for a different color in addition to the cyan (C) head, the magenta (M) head, and the yellow (Y) head, and the black (K) head.

The communication network 14 may include the Internet, a local area network (LAN), Wi-Fi (registered trademark), and/or Bluetooth (registered trademark).

Figure 2:
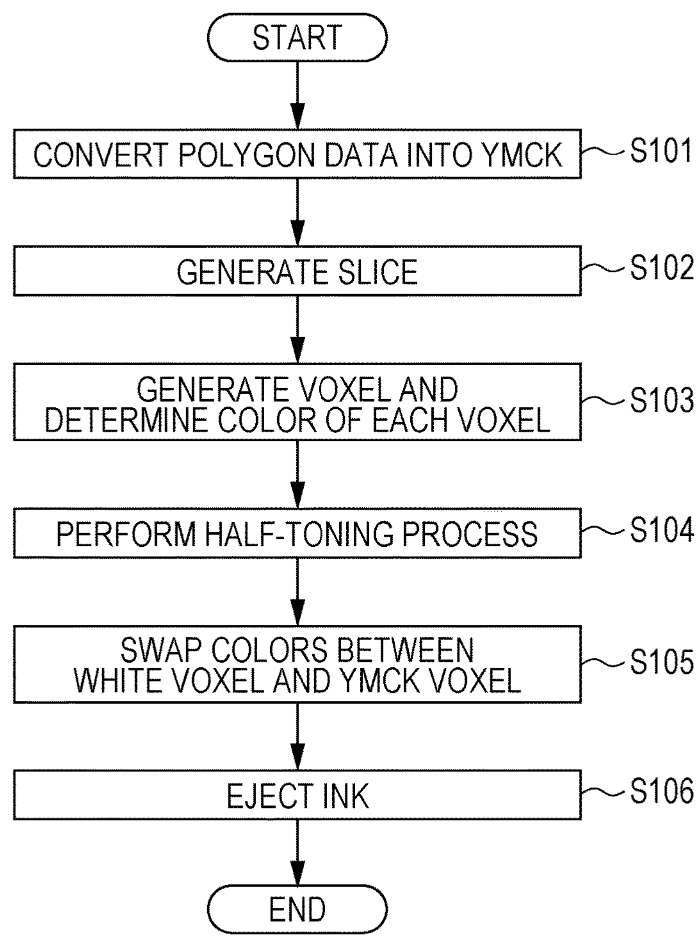
FIG. 2 is a flowchart of a whole process.

FIG. 2 is a flowchart of a whole process of the 3D object molding system.

The CPU 101 in the data processing apparatus 10 retrieves the 3D object data (3D data), and converts the retrieved 3D data, more specifically, RGB color data of polygon data into CMYK color data (S101). The CPU 101 may retrieve the 3D data from an optical disk, such as a CD-ROM, or a USB memory via the input and output interface 104. Alternatively, the CPU 101 may retrieve the 3D data via the communication interface 105 from another computer connected to the communication network 14. The 3D data indicates a three-dimensional shape of an object, more specifically, indicates an external shape and a color of a surface of the object. The 3D data is data of polygons, and includes color data (RGB data, for example) of a surface of an object. A polygon is an element when an object is expressed using triangles or rectangles. The format of the 3D data is not limited to any particular one. The data format may be the one that is produced using computer-aided design (CAD) software or may be the one that is produced using computer graphics software. Any related art technique may be used to convert the 3D data from RGB to CMYK. Complementary color conversion or a lookup table (LUT) may be used as with a 2D printer. If the clear head 129 in the 3D object molding apparatus 12 ejects a colorless and transparent ink (molding liquid), and the color indicated by the color data (r,g,b) is white (all the values indicated by RGB are maximum), the color is converted into an achromatic color.

The CPU 101 in the data processing apparatus 10 generates the slice data from the polygon data in accordance with the processing program stored on the program memory 102 (S102). The thickness of the slice data is the thickness of one side of voxel.

The CPU 101 in the data processing apparatus 10 generates a voxel group forming the slice data on a per slice basis while determining a color of each voxel in the voxel group (S103). The CPU 101 determines the color data at each depth from the surface of the object, based on the color data of the polygon of the 3D object. A basic algorithm in the color data determination includes determining the color of each layer of a 3D object with plural layers starting with a surface layer first, and determining the order of colors in a manner such that a color with a smaller L* value is assigned to a layer of the object closer to the surface of the object.

The CPU 101 in the data processing apparatus 10 performs the half-toning process in accordance with the processing program stored on the program memory 102 (S104). The half-toning process is a related art technique. As in the 2D printer, pseudorandom number, error diffusion, and dither threshold matrix may be used. In the half-toning process using pseudorandom number, a random number is compared with a density value of color data. If the random number is equal to or below the density value, an on determination results. If the random number is above the density value, an off determination results. Only if the on determination results, the color data is used. In the half-toning process using the dither threshold matrix, a three-dimensional dither threshold matrix corresponding to each color of CMYK is stored on the program memory 102 in advance, and the color data is compared with each value of the dither threshold matrix in terms of magnitude. If the color data is equal to or above the threshold value, an on determination results. If the color data is below the threshold value, an off determination results. Only if the on determination results, the color data is used. Through the half-toning process, the color data of each voxel becomes data that indicates only one of cyan (C), magenta (M), yellow (Y), black (K), achromatic (white or transparent).

The CPU 101 in the data processing apparatus 10 swaps colors between an achromatic (white or transparent) voxel and a color voxel (a CMYK voxel) in accordance with the processing program stored on the program memory 102 (S105). An achromatic voxel may be in the surface of the object in the half-toning process. If a white voxel as an achromatic voxel is present on the surface side, it is difficult to reflect in color reproduction the color of a color voxel at a layer deeper than the white voxel. The color swapping process to swap the achromatic voxel clears this problem. The color swapping process is typically intended to swap colors of an achromatic voxel and a color voxel adjacent thereto but is not necessarily limited to the adjacent color voxel.

In accordance with the processing program, the CPU 101 in the data processing apparatus 10 transmits data of one slice to the 3D object molding apparatus 12 via the communication interface 105 and the communication network 14. One slice corresponds to an amount of ink ejectable by one step of motion of the color heads 128 and the clear head 129 in the 3D object molding apparatus 12.

The CPU 121 in the 3D object molding apparatus 12 receives the slice data via the communication interface 124, controls the motor driver 126 and the head driver 127 in accordance with the slice data, and causes the color heads 128 and the clear head 129 to eject inks (molding liquids) to form an object (S106). The CPU 121 repeats slice extraction and the ink ejection of the color heads 128 and the clear head 129, and stacks the slices in the direction of height to form the object.

Figure 3A:
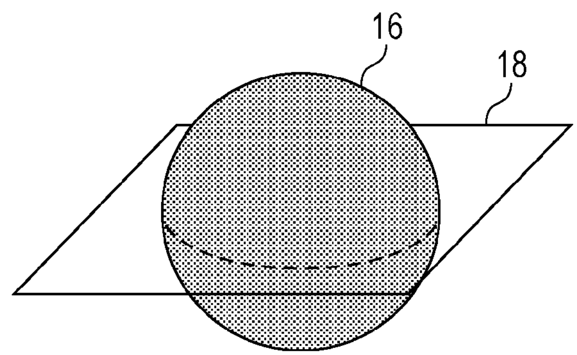
FIG. 3A through FIG. 3C illustrate slice data.
Figure 3B:
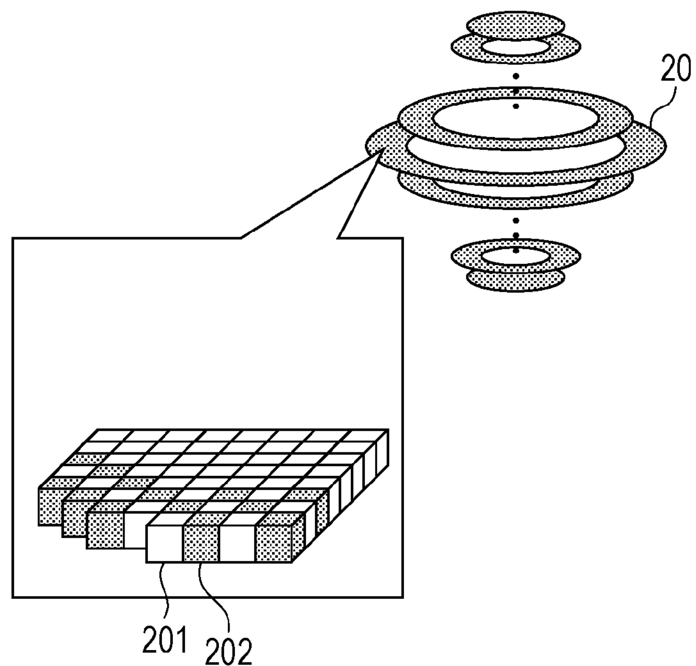
Figure 3C:
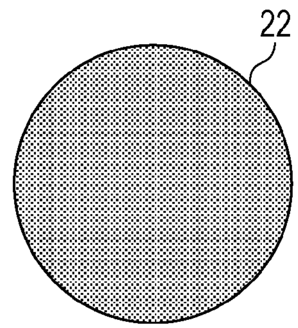

FIG. 3A through FIG. 3C schematically illustrate the slice data. When the 3D data is converted into the voxel data and the color data of each voxel is determined as illustrated in FIG. 3A, 3D data 16 including these voxels is successively sliced at a specific slice plain 18, and slice data 20 is extracted as illustrated in FIG. 3B. The slice data 20 includes plural pieces of voxel data, and thus includes data of an achromatic voxel 201 and data of a color voxel 202.

Figure 4:
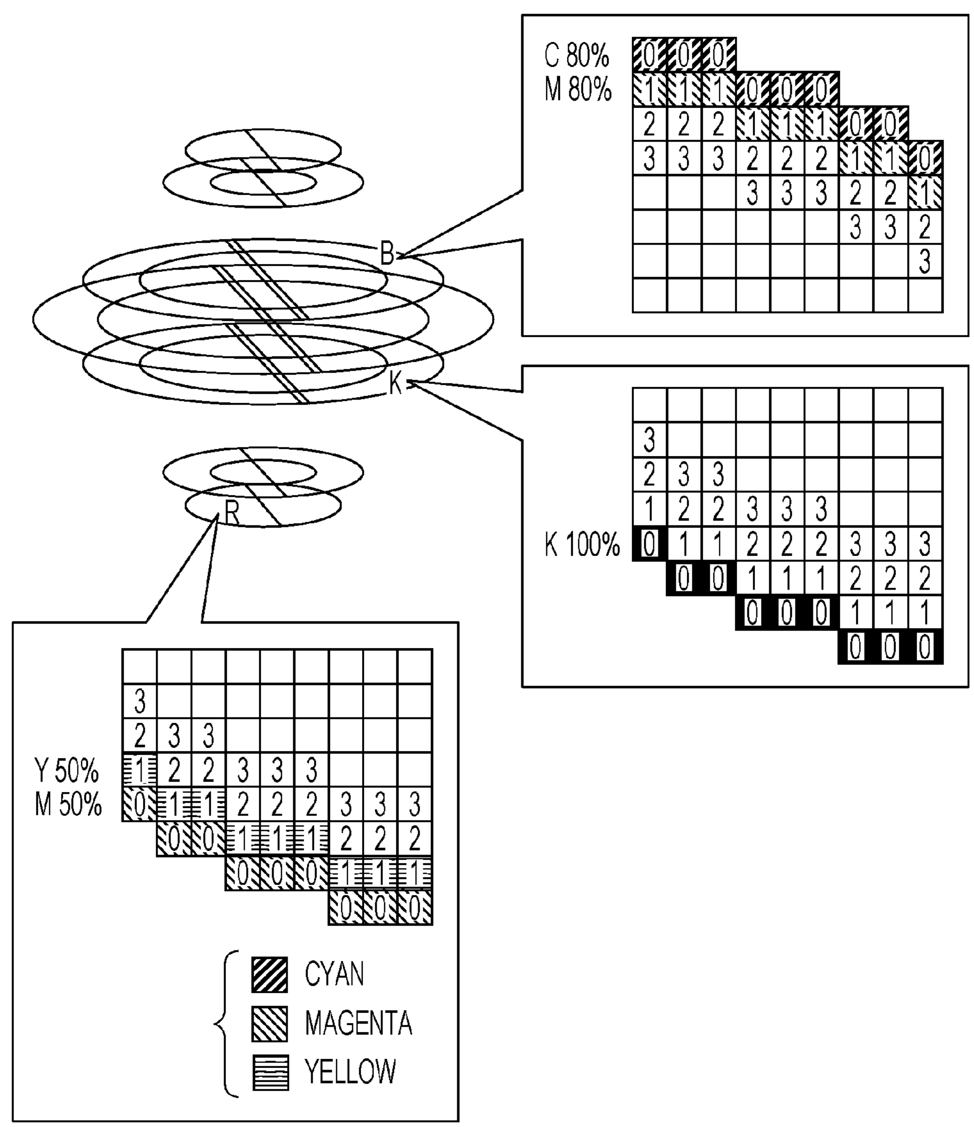
FIG. 4 illustrates voxel groups forming the slice data.

FIG. 4 illustrates, in detail, voxel groups forming the slice data. The thickness of each slice is equal to the thickness of one side of a voxel. The color data of each voxel is determined at each layer depth depending on the color data of surface polygons.

The 3D data may now be related to a sphere that is tinted with four colors of RGBK. R color includes 50% magenta (M), and 50% yellow (Y), G color includes 50% cyan (C) and 50% yellow, and B color includes 80% cyan and 80% magenta (M). The slice data of an R color portion is 50% magenta (M), and 50% yellow (Y). If the slices are viewed from above, the layers include layer 0 (namely, the surface layer labeled with "0"), layer 1 (labeled with "1"), layer 2 (labeled with "2"), and layer 3 (labeled with "3"). Voxels in the layer 0 are tinted 50% magenta (M) and voxels in the layer 1 are tinted 50% yellow (Y).

The slice data of a B color portion is 80% cyan (C) and 80% magenta (M). Voxels in the layer 0 are tinted 80% cyan, and voxels in the layer 1 are tinted 80% magenta (M).

The slice data of a K color portion is 100% black (K), and voxels in the layer 0 are tinted 100% black (K).

Figures 5, 6:
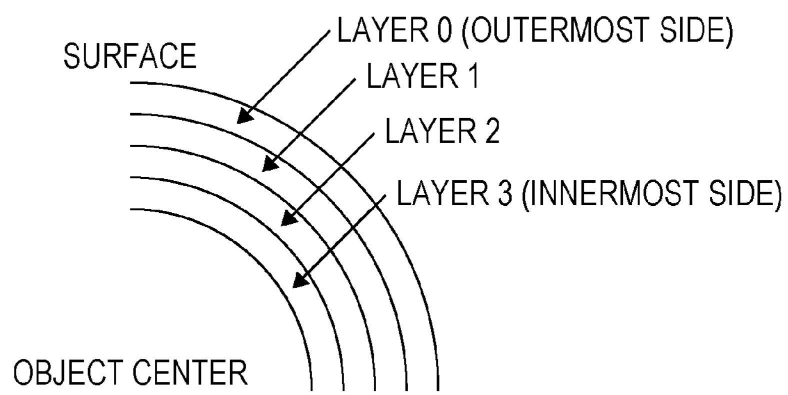
FIG. 5 illustrates layers of a three-dimensional (3D) object.
FIG. 6 illustrates an assignment of each color to each layer.

The color data determination method of each voxel performed in step S103 is schematically illustrated in FIG. 5 and FIG. 6. The CPU 101 determines that plural layers are nested inwardly from the surface of the object. As previously described, the object includes the layer 0, the layer 1, the layer 2, and the layer 3 in that order from the surface. Color assignment starts with the layer on the surface. The assigning of each of cyan (C), magenta (M), yellow (Y), and black (K) to each layer is performed in any manner. If each layer is tinted with one color, the inks are desirably assigned to the layers from the surface of the object in the order of the inks from one having a smaller L* value to another having a larger L* value, namely, from a darker color to a lighter color. For example, the R color portion is tinted magenta (M) and yellow (Y). Since M<Y in terms of L* value, the layer 0 is tinted magenta (M) with a higher priority, and the layer 1 is tinted yellow (Y).

FIG. 6 is a table listing a relationship between a depth (layer 0 through layer 3) and colors to be reproduced. Referring to FIG. 6, W represents an achromatic color (white or transparent), Y yellow, M magenta, C cyan, K black, YM a mixture of yellow and magenta, MC a mixture of magenta and cyan, YC a mixture of yellow and cyan, and YMCK a mixture of the four colors.

If the color is achromatic (white or transparent), an achromatic color is assigned to all the voxels in the layer 0 through layer 3.

If the color is yellow (Y), the voxels in the layer 0 are tinted yellow (Y), and the voxels in the other layers are tinted achromatic.

If the color is magenta (M), the voxels in the layer 0 are tinted magenta (M), and the voxels in the other layers are tinted achromatic.

If the color is cyan (C), the voxels in the layer 0 are tinted cyan (C), and the voxels in the other layers are tinted achromatic.

If the color is black (K), the voxels in the layer 0 are tinted black (K), and the voxels in the other layers are tinted achromatic.

If one color is used as described above, the voxels in the layer 0 closest to the surface are naturally tinted with that color.

On the other hand, if the color is YM, the magnitude relationship of L* values is M<Y. The voxels in the layer 0 are tinted magenta (M), and the voxels in the layer 1 are tinted yellow (Y). The layer 2 and layer 3 are tinted achromatic.

If the color is MC, the magnitude relationship of L* values is C<M. The voxels in the layer 0 are tinted cyan (C), and the voxels in the layer 1 are tinted magenta (M). The layer 2 and layer 3 are tinted achromatic.

If the color is YC, the magnitude relationship of L* values is C<Y. The voxels in the layer 0 are tinted cyan (C), and the voxels in the layer 1 are tinted yellow (Y).

If the color is YMCK, the magnitude relationship of L* values is K<C<M<Y. The voxels in the layer 0 are tinted black (K), the voxels in the layer 1 are tinted cyan (C), the voxels in the layer 2 are tinted magenta (M), and the voxels in the layer 3 are tinted yellow (Y).

FIG. 6 illustrates an example of color assignment, and the color assignment method is also applied to colors other than those described above. For example, in the case of a color mixture of two colors YK, the magnitude relationship of L* values is K<Y. The voxels in the layer 0 are tinted black (K), the voxels in the layer 1 are tinted yellow (Y), and the voxels in the other layers are tinted achromatic.

In this way, the colors are assigned to the layers of the object starting with the surface side of the object in the priority order of the colors from one having a smaller L* value to another having a larger value, more specifically, in the priority order of black (K), cyan (C), magenta (M), and yellow (Y). The reason for this arrangement is described below.

Figure 7A:
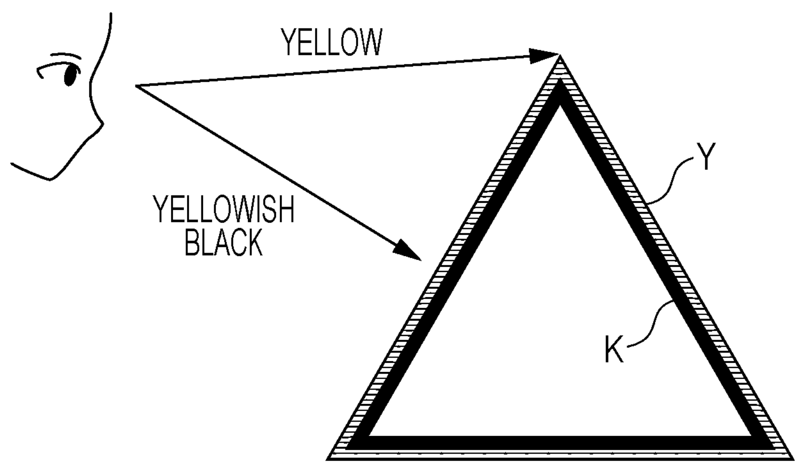
FIG. 7A and FIG. 7B illustrate how objects look.
Figure 7B:
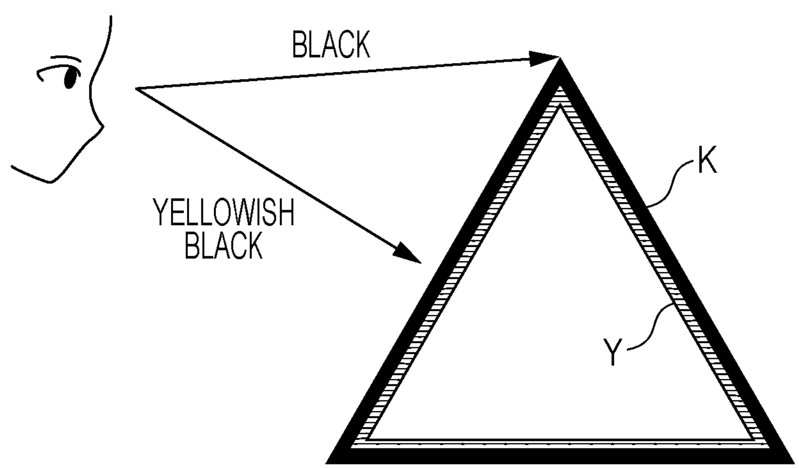

FIG. 7A and FIG. 7B illustrate the manufacturing of an object which is tinted yellowish black, namely, a mixture of yellow (Y) and black (K).

Referring to FIG. 7A, the voxels in the layer 0 are tinted yellow (Y), and the voxels in the layer 1 are tinted black (K). When a user views the central portion of the object, it looks yellowish black, but when the user views an edge of the object, the object looks as if it is fringed with only a yellow (Y) color. Depending on the viewing location, the object looks different in color and color uniformity is not provided.

On the other hand, FIG. 7B illustrates an example of an object in which the voxels in the layer 0 are tinted black (K), and the voxels in the layer 1 are tinted yellow (Y). When the user views the central portion of the object, it looks yellowish black. When the user views an edge of the object, the object looks black because there is no portion where only yellow (Y) is present as illustrated in FIG. 7A. A difference as to how the object looks different between the central portion and edge portion thereof is smaller. In other words, the color assignment in the order of a smaller L* value to a larger L* value from the surface side of the object achieves uniformity in color reproducibility between the central portion (surface portion) and the edge portion.

Figure 8A:
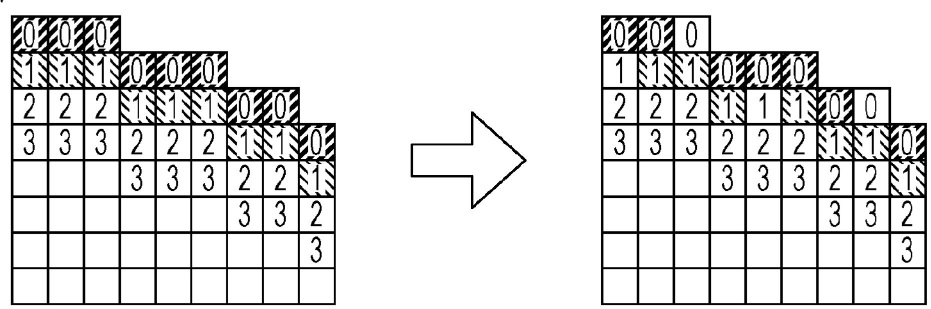
FIG. 8A through FIG. 8C illustrate a half-toning process.
Figure 8B:
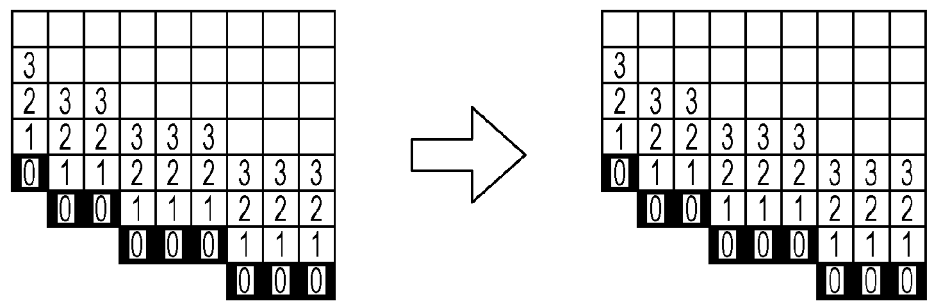
Figure 8C:
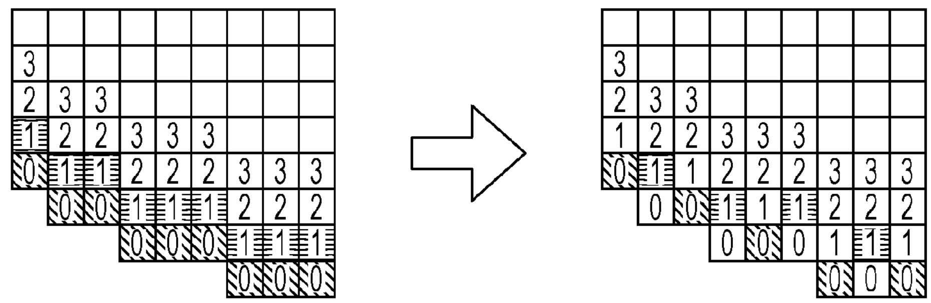

FIG. 8A through FIG. 8C schematically illustrate the half-toning process performed in S104. In the half-toning process, the color data of each voxel is binarized using random numbers, error diffusion, or dither threshold matrix, and is thus determined to be one of cyan (C), magenta (M), yellow (Y), black (K), and achromatic (white or transparent).

FIG. 8A illustrates the slice data of 80% cyan (C) and 80% magenta (M) viewed from above. The half-toning process is performed on the slice data, thereby determining whether the slice data is 100% cyan (C) or 100% magenta (M). The voxels in the layer 0 are 80% cyan (C) prior to the half-toning process as illustrated in FIG. 8A. Subsequent the half-toning process, the voxels of 100% cyan (C) and the achromatic voxels are present at a ratio of 80:20. Note that achromatic voxels are present in the layer 0 subsequent to the half-toning process. Similarly, the voxels in the layer 1 are 80% magenta (M) prior to the half-toning process. Subsequent the half-toning process, the voxels of 100% magenta (M) and the achromatic voxels are present at a ratio of 80:20. Note that achromatic voxels are present in the layer 1 subsequent to the half-toning process.

FIG. 8B illustrates the slice data of 100% black (K) viewed from above. Since the density is 100%, no change occurs in the voxels through the half-toning process. In other words, all the voxels in the layer 0 remain black (K).

FIG. 8C illustrates the slice data of 50% yellow (Y) and 50% magenta (M) viewed from above. The half-toning process is performed on the slice data, thereby determining whether the slice data is 100% yellow (Y) or 100% magenta (M). The voxels in the layer 0 are 50% magenta (M) prior to the half-toning process as illustrated in FIG. 8C. Subsequent the half-toning process, the voxels of 100% magenta (M) and the achromatic voxels are present at a ratio of 50:50. Similarly, the voxels in the layer 1 are 50% yellow (Y) prior to the half-toning process. Subsequent the half-toning process, the voxels of 100% yellow (Y) and the achromatic voxels are present at a ratio of 50:50.

Figure 9:
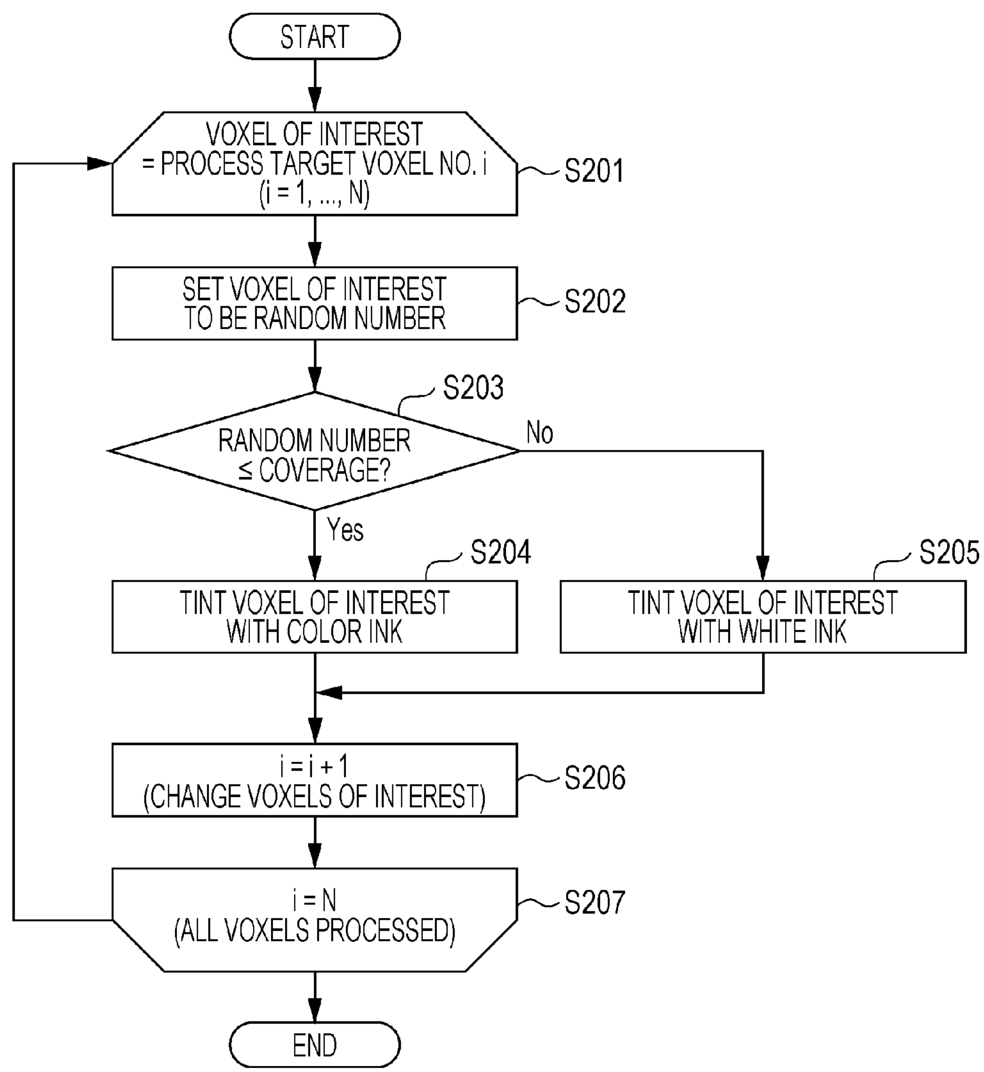
FIG. 9 is a flowchart illustrating of the half-toning process.

FIG. 9 is a flowchart illustrating the half-toning process performed by the CPU 101. The half-toning process is performed using random numbers.

The CPU 101 extracts a process target voxel No. i as a voxel of interest (S201), and sets a random number to the voxel of interest (S202). The random number may be a pseudo-random number falling within a range of 0 or higher to lower than 1.

The CPU 101 compares the set random number with a coverage (input density percentage) to determine whether the set random number is equal to or below the coverage (S203). If the random number is equal to or below the coverage, the CPU 101 sets the voxel of interest to be a color voxel (S204). If the random number is above the coverage, the CPU 101 sets the voxel of interest to be an achromatic (white or transparent) voxel (S205). If the input density is 80% (=0.8), the random number is compared with 0.8. If the random number ≤0.8, the determination result is yes, and the voxel is tinted with the color. If the random number >0.8, the determination result is no, and an achromatic voxel is used. The higher the input density is, the larger the number of remaining color voxels is.

The CPU 101 increments i by 1 (S206), and iterates operations in S201 through S206 until the last voxel N belonging to the slice data is processed (S207). The above routine is performed on the slice data of each slice.

The half-toning process may be successively performed on each color of CMYK, or may be concurrently performed on the colors without any priority to any particular color.

Through the half-toning process, the achromatic voxels appear on the surface of the object as illustrated in FIG. 8A and FIG. 8C. The color swapping process is to be performed to replace each achromatic voxel with a color voxel.

Figure 10A:
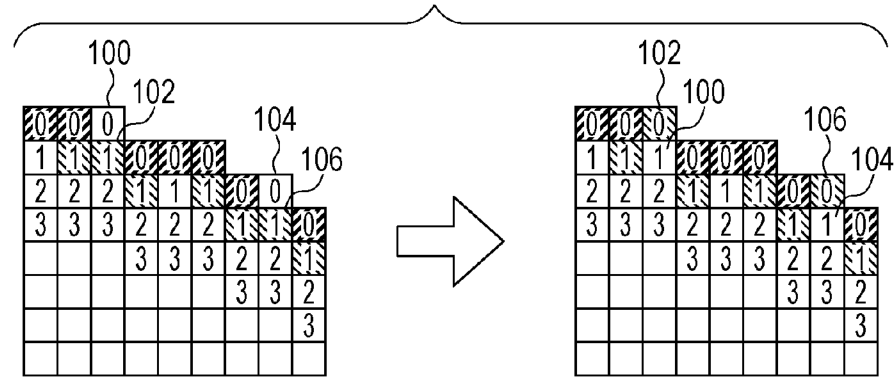
FIG. 10A through FIG. 10C illustrate a color swapping process.
Figure 10B:
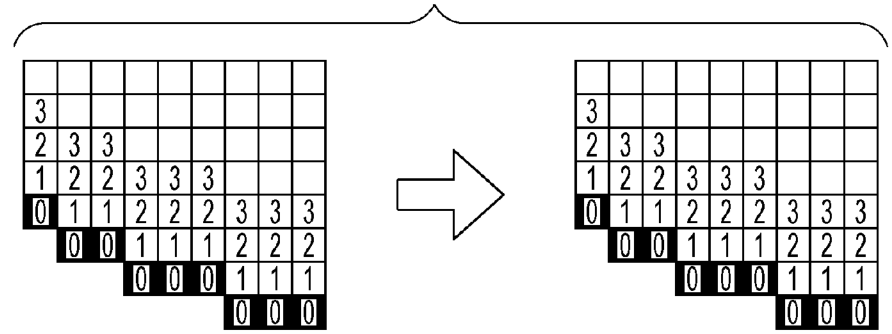
Figure 10C:
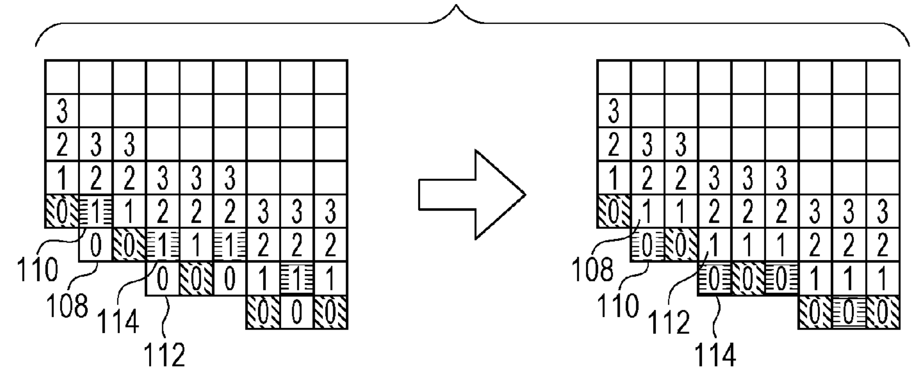

FIG. 10A through FIG. 10C schematically illustrate the voxel color swapping process performed in S105. Subsequent to the half-toning process, an achromatic voxel is present for a color that has a coverage (input density percent) not equal to 100%. It is difficult to reflect a color present inside an achromatic voxel in color reproduction. More specifically, if the achromatic voxel is a white voxel, that portion looks whitish, and if the achromatic voxel is a transparent voxel, gloss of the object is lost.

If an achromatic voxel is present on the surface of an object, the CPU 101 tints the achromatic voxel with the color of a color voxel immediately inside the achromatic voxel in the object, while replacing that color voxel with the achromatic voxel. In other words, the CPU 101 swaps colors between the achromatic voxel and the color voxel. The color swapping process is performed on all the achromatic voxels in each layer in the object internally from the surface thereof until no swappable achromatic voxel is present. Through the color swapping process, all achromatic voxels are localized in the center portion of the object.

FIG. 10A illustrates slice data of 80% cyan (C) and 80% magenta (M) corresponding to the slice data of FIG. 8A. The slice data includes an achromatic voxel 100 in the layer 0, and a color voxel 102 of magenta (M) in the layer 1 adjacent to the layer 0. These voxels are swapped with each other such that the color voxel 102 of magenta (M) is present in the layer 0 and the achromatic voxel 100 is present in the layer 1 adjacent to the layer 0. Similarly, an achromatic voxel 104 in the layer 0 and a color voxel 106 of magenta (M) in the layer 1 are swapped with each other such that the color voxel 106 of magenta (M) is present in the layer 0 and the achromatic voxel 104 is present in the layer 1.

FIG. 10B illustrates the slice data of 100% black (K). Since no achromatic voxel is present in the layer 0 even through the half-toning process, no color swapping process is performed.

FIG. 10C illustrates slice data of 50% magenta (M) and 50% yellow (Y) corresponding to the slice data of FIG. 8C. The slice data includes an achromatic voxel 108 in the layer 0, and a color voxel 110 of yellow (Y) in the layer 1 adjacent to the layer 0. These voxels are swapped with each other such that the color voxel 110 of yellow (Y) is present in the layer 0 and the achromatic voxel 108 is present in the layer 1 adjacent to the layer 0. Similarly, an achromatic voxel 112 in the layer 0 and a color voxel 114 of yellow (Y) in the layer 1 are swapped with each other such that the color voxel 114 of yellow (Y) is present in the layer 0 and the achromatic voxel 112 is present in the layer 1.

The process described above is described more in detail below.

FIG. 11A illustrates the slice data of 80% cyan (C) and 80% magenta (M) corresponding to the slice data of FIG. 10A.

Referring to FIG. 11A, the CPU 101 reads a voxel group forming the layer 0 from the working memory 103, selects one voxel, and determines whether the selected voxel is an achromatic voxel. The half-toning process assigns the color data to each voxel. By referencing the color data, the CPU 101 determines whether each voxel is achromatic or not. Alternatively, a parameter or flag, separately from the color data, may be set on each voxel to indicate whether the voxel is achromatic or not. In such a case, the CPU 101 may reference the parameter or flag to determine whether the voxel is achromatic or not.

If the selected voxel is the achromatic voxel 100, the CPU 101 reads from the working memory 103 a voxel adjacent to the achromatic voxel 100 in the layer 1 adjacent to the layer 0, and determines whether the voxel is a color voxel. If the adjacent voxel is the color voxel 102 of magenta (M), the achromatic voxel 100 and the color voxel 102 are swapped with each other. More specifically, let B1(c1, m1, y1, k1, 0) represent the achromatic voxel in the layer 0, and B100(C2, m2, y2, k2, 1) represent the color voxel in the layer 1 (the fifth parameter indicates whether the voxel is a color voxel or an achromatic voxel wherein "0" represents achromatic, and "1" represents color), and the colors of the two voxels are swapped, in other words, B1(C2, m2, y2, k2, 1) and B100(c1, m1, y1, k1, 0) result.

Referring to FIG. 11B, the CPU 101 selects a voxel from the layer 0, and determines whether the selected voxel is achromatic or not. If the selected voxel is a color voxel 101 of cyan (C), swapping with an adjacent voxel 103 is not performed.

Referring to FIG. 11C, the CPU 101 selects another voxel from the layer 0, and determines whether the selected voxel is achromatic or not. If the selected voxel is a color voxel 105 of cyan (C), swapping with an adjacent voxel 107 is not performed.

The above-described process is successively performed on the layer 0. When all voxels in the layer 0 are processed, the identical process is repeated on the layer 1, the layer 2, and the layer 3.

Figure 12:
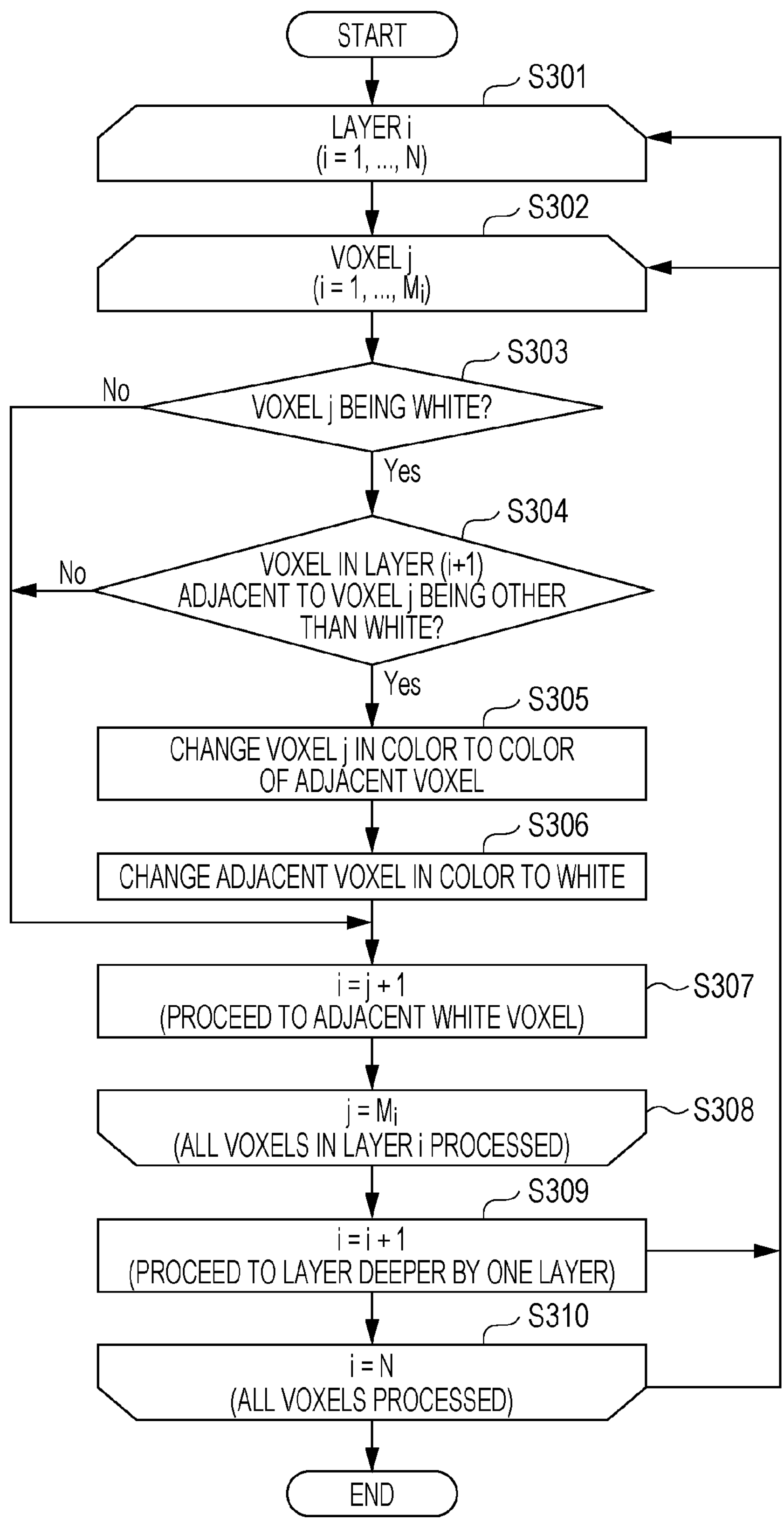
FIG. 12 is a flowchart illustrating the color swapping process.

FIG. 12 is a flowchart illustrating the color swapping process performed by the CPU 101.

The CPU 101 selects a layer and a voxel in that layer (S301 and S302), and determines whether the selected voxel is achromatic (white or transparent) (S303).

If the selected voxel is achromatic, the CPU 101 determines whether a voxel adjacent to the selected voxel in a layer adjacent to the selected layer is other than an achromatic voxel, namely, a color voxel (S304). If the adjacent voxel is a color voxel, the CPU 101 changes the achromatic voxel to the color of that adjacent voxel (S305). The CPU 101 changes the adjacent color voxel to the achromatic voxel (a white voxel, for example) (S306). On the other hand, if the selected voxel is not achromatic (no branch from S303) or if the adjacent voxel in the adjacent layer is achromatic even with the selected voxel being achromatic (no branch from S304), operations in steps S305 and S306 are not performed and the color swapping process is not performed.

The above-described process is performed on all voxels in a given layer (S307 and S308), and is then performed on the voxels in a layer one layer deeper than the first layer (S309). The process is performed on all layers to process all the voxels (S310).

Figure 13A:
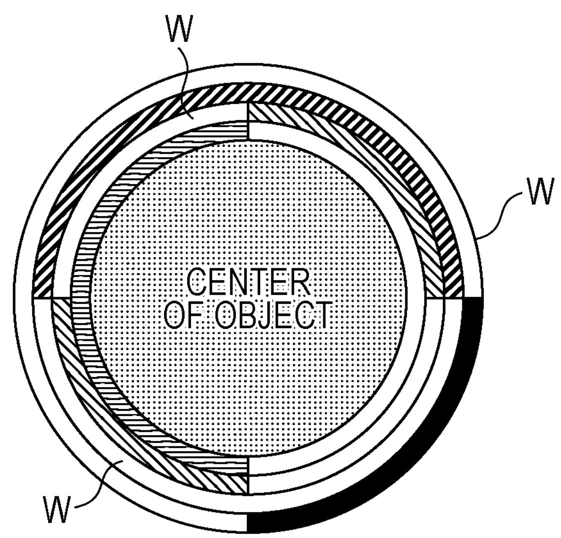
FIG. 13A and FIG. 13B respectively illustrate color assignments of related art and an exemplary embodiment.
Figure 13B:
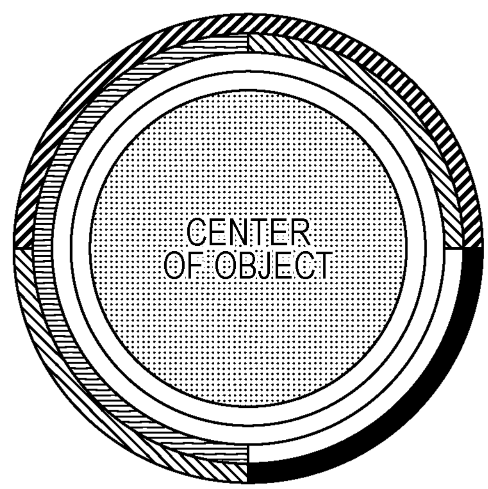

FIG. 13A and FIG. 13B illustrate the color assignment of related art and the color assignment of the exemplary embodiment. FIG. 13A illustrates the color assignment of related art, in which achromatic voxels are present in regions labeled with W. Achromatic voxels are present on the surface side of the object. FIG. 13B illustrates the color assignment of the exemplary embodiment. If there is an achromatic voxel, that achromatic voxel is swapped with an adjacent color voxel. There are not achromatic voxels on the surface of the object. Color voxels are placed on the surface side of the object.

In accordance with the exemplary embodiment, the following processes are performed:

(1) Process to assign colors to voxels from the surface side of the object in the order of the colors from one having a lower L* value to another having a higher L* value, and (2) Process to swap colors between an achromatic voxel and a color voxel subsequent to the half-toning process.

Through the processes, even if a large number of colors is contained in an object and the number of color mixed portions increases, color voxels are placed on the surface side of the object. Color reproduction is thus free from a reduction in chroma decrease and a reduction in gloss difference.

As illustrated in FIG. 8A through FIG. 8C, no achromatic voxels are present through the half-toning process if the input density is 100%, and an achromatic voxel is present through the half-toning process if the input density is less than 100%. Even if the input density is less than 100%, colors are assigned to voxels from the surface side of the object in the order of the colors from one having a lower L* value to another having a higher L* value.

The exemplary embodiment of the invention has been described. The present invention is not limited to the exemplary embodiment, and various modifications are possible. The modifications are described below.

First Modification

In accordance with the exemplary embodiment, one color is assigned to each layer as illustrated in FIG. 6. If color reproduction that presents a denser color than one color on each layer basis is to be performed, some colors or all colors may be assigned across plural layers.

FIG. 14 illustrates an example in which colors are assigned across plural layers. If an input color is reddish deep black, black (K), magenta (M), and yellow (Y) are assigned repeatedly across plural layers. Any order of black (K), magenta (M), and yellow (Y) is acceptable. As previously described, the colors are desirably assigned in the order of from a smaller L* value to a larger L* value. The layers are thus tinted as follows:

Layer 0: Black (K),
Layer 1: Magenta (M),
Layer 2: Yellow (Y),
Layer 3: Black (K),
Layer 4: Magenta (M),
Layer 5: Yellow (Y), . . .

Layer 6 and more inner layers are achromatic. Each of black (K), magenta (M), and yellow (Y) is assigned to two layers. The color assignment pattern of layer 0 through layer 2 is repeated on layer 3 through layer 5.

If the input color is very deep green, cyan (C) and yellow (Y) are assigned. A combination of cyan (C) and yellow (Y) is repeated across plural layers as follows:

Layer 0: Cyan (C),
Layer 1: Yellow (Y),
Layer 2: Cyan (C),
Layer 3: Yellow (Y),
Layer 4: Cyan (C), and
Layer 5: Yellow (Y).

Each of cyan (C) and yellow (Y) is assigned on three layers. Generally, a combination of at least two colors of CMYK in the order of one having a smaller L* value to another having a larger L* value is repeated across plural layers. Specifically, the phrase the "combination of at least two colors" may be a combination two colors, a combination of three colors, or a combination of four colors. In the case of the combination of two colors, YM, YC, YK, MC, or MK is available. In the combination of three colors, YMC, MCK, or YCK is available. If YM is used, the colors are repeated as follows:

Layer 0: Magenta (M),
Layer 1: Yellow (Y),
Layer 2: Magenta (M),
Layer 3: Yellow (Y),
Layer 4: Magenta (M), and
Layer 5: Yellow (Y).

If the four colors are combined, the colors may be repeated as follows:

Layer 0: Black (K),
Layer 1: Cyan (C),
Layer 2: Magenta (M),
Layer 3: Yellow (Y),
Layer 4: Black (K),
Layer 5: Cyan (C),
Layer 6: Magenta (M), and
Layer 7: Yellow (Y).

If the input layer is very deep process black, the combination may be repeated as described above. To make black (K) particularly deep, black (K) may be localized on the surface side. More specifically, Layer 0: Black (K),
Layer 1: Black (K),
Layer 2: Cyan (C),
Layer 3: Magenta (M),
Layer 4: Yellow (Y),
Layer 5: Cyan (C),
Layer 6: Magenta (M), and
Layer 7: Yellow (Y).

In this example, black (K) are concentrated on the surface side, and the remaining cyan (C), magenta (M), and yellow (Y) are repeated in combination.

Figure 15A:
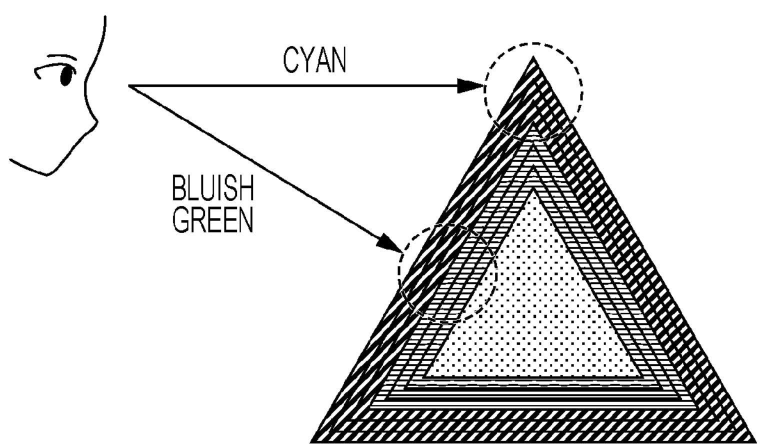
FIG. 15A and FIG. 15B illustrate how an object of the first modification looks.
Figure 15B:
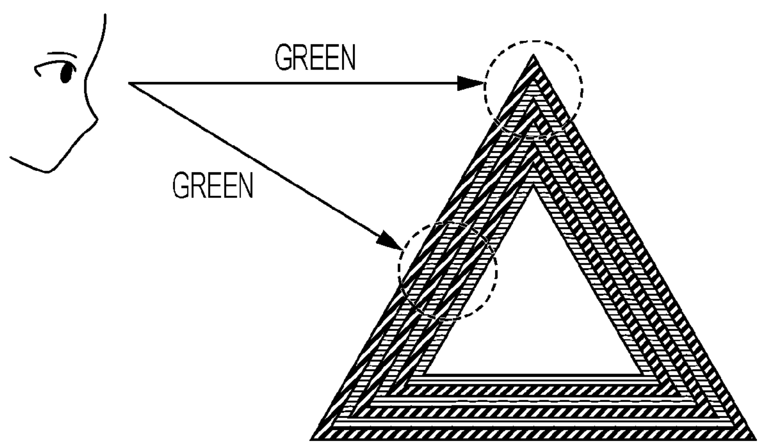

FIG. 15A and FIG. 15B schematically illustrate a feature that is obtained when a combination of at least two colors of CMYK is repeatedly assigned in the order from a smaller L* value to a larger L* value across plural layers.

FIG. 15A illustrates the color assignment to express very deep green as follows:

Layer 0: Cyan (C),
Layer 1: Cyan (C),
Layer 2: Cyan (C),
Layer 3: Yellow (Y),
Layer 4: Yellow (Y), and
Layer 5: Yellow.

If the cyan (C) layers are too thick, it is difficult to reflect the yellow (Y) layers present in the central portion of the object in color reproduction. As a result, the object looks bluish green. The central portion and the edge portion of the object look different in the color reproduction.

As illustrated in FIG. 14, FIG. 15B illustrates the color assignment as follows:

Layer 0: Cyan (C),
Layer 1: Yellow (Y),
Layer 2: Cyan (C),
Layer 3: Yellow (Y),
Layer 4: Cyan (C), and
Layer 5: Yellow (Y).

Since the central portion and the edge portion of the object equally look green, uniform color reproduction results. Since the distance from the surface to each cyan (C) layer and the distance from the surface to each yellow (Y) is shorter than that in FIG. 15A, the effect of these two colors on the color reproduction becomes more uniform.

Second Modification

If an achromatic voxel is present in a given layer, and a color voxel internally adjacent to the given layer is present in a layer one layer deeper than the given layer in the exemplary embodiment, the achromatic voxel and the color voxel are swapped to cause the surface side of the object to be tinted with the color of the color voxel. Alternatively, a color voxel that is to be swapped with the achromatic voxel may not be an adjacent voxel but a color voxel having the same color as the color of the layer to which the achromatic voxel belongs. For example, as illustrated in FIG. 14, the layer 0 is tinted cyan (C) to express very deep green. If an achromatic voxel is present in the layer 0 subsequent to the half-toning process, the achromatic voxel is not swapped with a voxel one layer deeper (the color voxel being yellow (Y)), but a color voxel in the layer 2 (being cyan (C)).

Figure 16A:
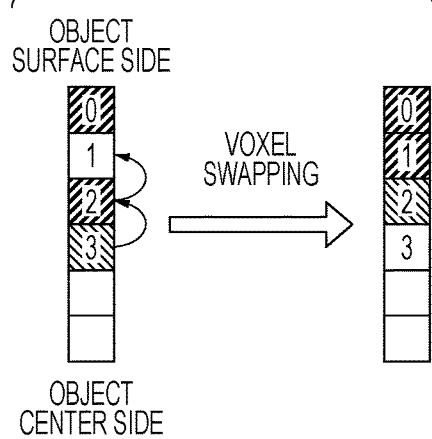
FIG. 16A and FIG. 16B illustrate voxel swapping of the exemplary embodiment.
Figure 16B:
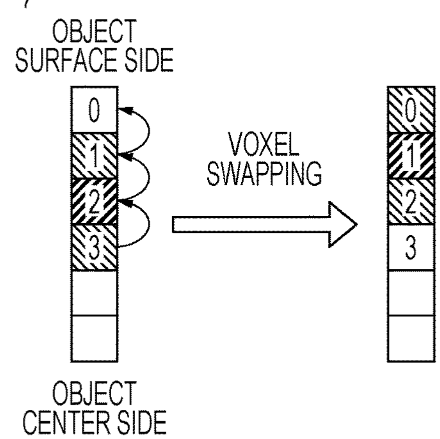

FIG. 16A and FIG. 16B, and FIG. 17A and FIG. 17B schematically illustrate the color swapping process of a second modification. FIG. 16A and FIG. 16B illustrate the color swapping process of the exemplary embodiment for comparison. Referring to FIG. 16A, an achromatic voxel in the layer 1 is swapped with a color voxel of cyan (C) in the layer 2 adjacent to the layer 1. Referring to FIG. 16B, an achromatic voxel in the layer 0 is swapped with a color voxel of magenta (M) in the layer 1 adjacent to the layer 0.

Figure 17A:
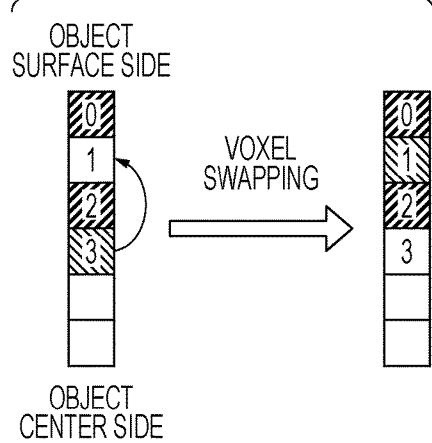
FIG. 17A and FIG. 17B illustrate voxel swapping of the second modification.
Figure 17B:
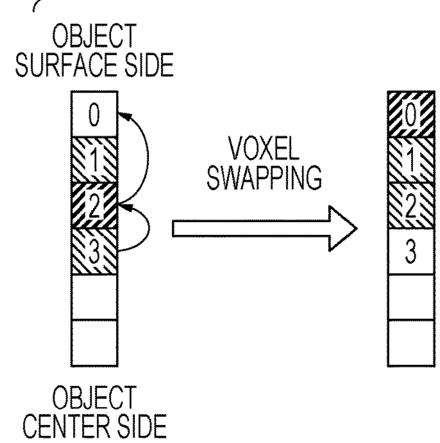

FIG. 17A and FIG. 17B illustrate the color swapping process of the second modification. Referring to FIG. 17A, the layer 1 is tinted magenta (M), and an achromatic voxel in the layer 1 is swapped with a color voxel of magenta (M) in the layer 3. Referring to FIG. 17B, the layer 0 is tinted cyan (C), and an achromatic voxel in the layer 0 is swapped with a color voxel of cyan (C) in the layer 2.

FIG. 18A through FIG. 18C schematically illustrate color swapping processes of the exemplary embodiment and the second modification. FIG. 18A illustrates the voxel layout as a result of the half-toning process. Achromatic voxels are present in each layer. FIG. 18B illustrates a voxel layout as a result of a swapping process in which each achromatic voxel is swapped with an adjacent color voxel. Each layer contains a random portion in color layout. In a special case (for example, if the size of a single voxel, namely, a drop of ink is large), granular quality may be degraded. FIG. 18C illustrates a voxel layout as a result of the color swapping process of the second modification. As illustrated in FIG. 18C, the layer 0 is uniformly cyan (C), and the layer 1 is uniformly magenta (M). Since the layers are uniformly tinted with the same color successively in the order from the surface, more uniform color reproduction results.

Third Modification

In accordance with the exemplary embodiment, the half-toning process and the color swapping process are performed on the slice data on a per slice basis. These processes may be performed on the process target slice data as well as slice data on top of and beneath the process target slice data in view of the 3D structure of the object.

Fourth Modification

In accordance with the exemplary embodiment, the data processing apparatus 10 and the 3D object molding apparatus 12 are separate apparatuses and connected to each other via the communication network 14 for data link. Alternatively, the data processing apparatus 10 and the 3D object molding apparatus 12 may be physically integrated into a 3D molding system.

The data processing apparatus 10 may be connected to a network server via the communication network 14. The 3D data retrieved by the data processing apparatus 10 as a client may be transmitted to the network server. The network may perform operations in steps S101 through S105 of FIG. 2, and transmit the slice data to the data processing apparatus 10 as the client or output the slice data to the 3D object molding apparatus 12. In such a case, the network server may function as the data processing apparatus 10.

Fifth Modification

In accordance with the exemplary embodiment, the data processing apparatus 10 performs the operations in steps S101 through S105 of FIG. 2, and the 3D object molding apparatus 12 performs the operation in step S106. Alternatively, all operations down to step S103 may be performed by the data processing apparatus 10 and the remaining operations may be performed by the 3D object molding apparatus 12. The output data from the data processing apparatus 10 may be temporarily stored on a recording medium, and may then be transmitted from the recording medium to the 3D object molding apparatus 12.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:

a processor configured to act as:

a receiving unit that receives first data that defines a shape of and a color of a surface of a three-dimensional object on each specific surface region of the three-dimensional object; and a generating unit that generates color voxel data from the first data, wherein the generating unit assigns a plurality of color components to a plurality of surface voxels in accordance with color information on the color of the surface in the first data, starting with surface voxels, in a priority order of the color components from one having a lower lightness value to another having a higher lightness value, and does not assign an achromatic color component to a surface voxel if a density of the color of the surface in the first data is less than 100 percent, wherein the generating unit assigns the color components to the voxels in a priority order of black, cyan, magenta, and yellow, starting with the surface voxels.

2. The data processing apparatus according to claim 1, wherein the color components correspond to a plurality of color signals that are generated by a three-dimensional molding apparatus, and wherein the generating unit generates the color voxel data in a manner such that one of the color components is assigned to each of the voxels as the color information.

3. The data processing apparatus according to claim 1, wherein the generating unit repeatedly assigns a combination of at least two colors selected from black, cyan, magenta, and yellow, starting with the surface voxels.

4. The data processing apparatus according to claim 1, wherein if an achromatic color voxel is present on a surface side of the object with an input density being less than 100 percent, the generating unit swaps colors between the achromatic color voxel and an internally adjacent color voxel that is located deeper than the achromatic color voxel.

5. The data processing apparatus according to claim 1, wherein if an achromatic color voxel is present on a surface side of the object with an input density being less than 100 percent, the generating unit swaps colors between the achromatic color voxel and a color voxel that is located deeper than the achromatic color voxel and has a color identical to a color of another voxel that is located as deep as the achromatic color voxel.

6. The data processing apparatus according to claim 4, wherein the generating unit performs color swapping subsequent to a half-toning operation.

7. The data processing apparatus according to claim 5, wherein the generating unit performs color swapping subsequent to a half-toning operation.

8. A three-dimensional object molding system comprising:

the data processing apparatus according to claim 1; and a three-dimensional object molding apparatus that molds a three-dimensional object using data output from the data processing apparatus.

9. A non-transitory computer readable medium storing a program causing a computer to execute a process for molding a three-dimensional object, the process comprising:

inputting three-dimensional object data; and in generating and outputting colors of voxels from the three-dimensional object data, assigning color components to voxels in an order of the color components from one having a lower L* value to another having a higher L* value, and outputting the colors in a manner such that no achromatic color voxel is present on a surface side of the three-dimensional object if an input color density is less than 100 percent, wherein the color components to the voxels are assigned in a priority order of black, cyan, magenta, and yellow, starting with the surface voxels.

* * * * *